United States Patent [19]

Dahm et al.

[11] Patent Number: 4,668,580
[45] Date of Patent: May 26, 1987

[54] CONTINUOUS PRODUCTION OF MICROCAPSULE DISPERSIONS

[75] Inventors: Manfred Dahm, Leverkusen; Gert Jabs, Odenthal; Georg Wawra, Leverkusen, all of Fed. Rep. of Germany

[73] Assignee: Bayer Aktiengesellschaft, Leverkusen, Fed. Rep. of Germany

[21] Appl. No.: 740,635

[22] Filed: Jun. 3, 1985

[30] Foreign Application Priority Data

Jun. 13, 1984 [DE] Fed. Rep. of Germany ....... 3421865

[51] Int. Cl.$^4$ ................. B01J 13/02; B32B 27/40
[52] U.S. Cl. ................. 428/402.21; 264/4.7; 346/215; 428/914
[58] Field of Search ............ 264/4.7; 428/402.21

[56] References Cited

U.S. PATENT DOCUMENTS

| | | | |
|---|---|---|---|
| 3,864,275 | 2/1975 | Chigasaki et al. | 252/364 X |
| 3,886,085 | 5/1975 | Kiritani et al. | 428/402.21 |
| 4,275,905 | 6/1981 | Miller | 264/4.7 X |
| 4,324,817 | 4/1982 | Dahm et al. | 264/4.7 X |

FOREIGN PATENT DOCUMENTS

| | | |
|---|---|---|
| 3245801 | 6/1983 | Fed. Rep. of Germany . |
| 1415039 | 9/1965 | France . |
| 1091077 | 11/1967 | United Kingdom ........ 264/4.7 |
| 2011341 | 7/1979 | United Kingdom . |
| 2111456 | 7/1983 | United Kingdom . |

Primary Examiner—Richard D. Lovering
Attorney, Agent, or Firm—Connolly & Hutz

[57] ABSTRACT

Process for the production of microcapsule dispersions according to the polyaddition process, wherein an inert organic liquid is continuously mixed under strong turbulence with a polyisocyanate, insoluble therein, this mixture is emulsified in an aqueous phase as dispersed phase and the emulsion formed is continuously reacted with a polyamine.

3 Claims, 1 Drawing Figure

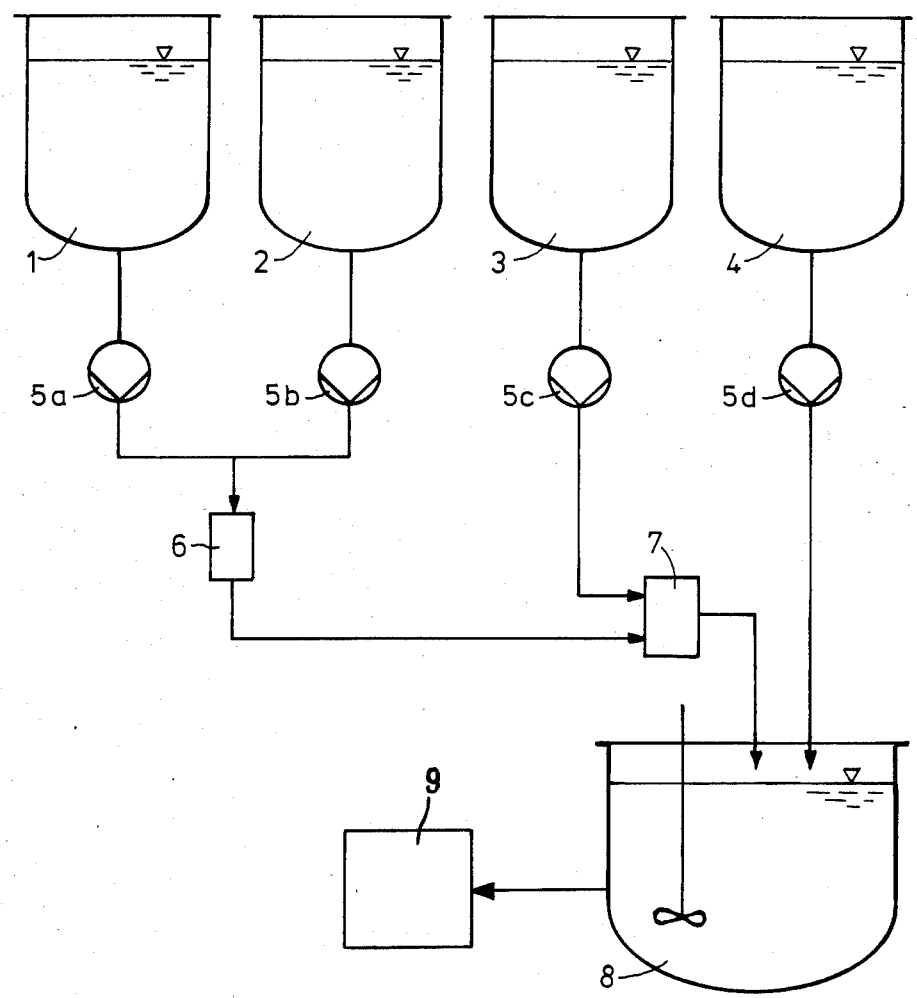

CONTINUOUS PRODUCTION OF MICROCAPSULE DISPERSIONS

This invention relates to a process for the production of microcapsule dispersions according to the polyaddition process, wherein an inert organic liquid is continuously mixed under strong turbulence with a polyisocyanate, insoluble therein, this mixture is emulsified in an aqueous phase as dispersed phase and the emulsion formed is continuously reacted with a polyamine.

Processes for the production of microcapsules by interfacial polyaddition between polyisocyanates and polyamines are known and described, for example, in the German Offenlegungsschriften Nos. 2 109 335; 2 251 381; 2 242 910; 2 120 921; 2 311 712 and 2 523 586.

With the known processes, microcapsule dispersions of good quality and narrow capsule size distribution are only obtained when the polyisocyanate used is dissolved in the dispersed organic phase. If mixtures of inert liquids and polyisocyanates, insoluble therein, are used as the organic phase, then a proportion of the droplets coalesce during emulsification in the aqueous phase and subsequent reaction, and droplets are obtained which diverge very greatly in size. Moreover, the distribution and concentration of the polyisocyanate in the "oil droplets" is uneven, so that in the following interfacial polyaddition, microcapsules with differing wall thicknesses are obtained. Oil droplets may even be found in the emulsion, which contain no isocyanate and thus cannot be encapsulated. The microcapsule dispersions thus obtained, have in any case a bad, for technical purposes in many cases unserviceably broad distribution spectrum of the capsule diameters, and contains leaky microcapsules as well as free core materials.

For the aforementioned reasons, in the interfacial processes for microencapsulation known so far, only polyisocyanates and rore materials have been used, which are homogeneously miscible and give a homogeneous organic phase after mixing, which is emulsified and forms the wall polymer. If the polyisocyanate is insoluble in solvent, it has been attempted to make it soluble through a readily volatile solubilizer. Since this solubilizer has to be removed again on or during the capsule wall formation, this procedure is very tedious.

Particularly in the case of dye-precursor-containing microcapsules for the production of carbon-free copying paper, a narrow distribution spectrum of the capsule diameters is necessary for good sharpness of the copies. Leaking microcapsules release dye-precursors without application of pressure, whereby the paper is discoloured. Thin capsule walls increase the tendency of the papers to become smudged, owing to their sensitivity to pressure, while too strong capsules do not allow the microcapsules to break under reduced writing pressure, thereby worsening the copy.

It has now been found, that "inhomogeneous" organic phases can be used without disadvantage for the production of microcapsules, if suitable wall-forming polyisocyanates and nuclear materials are continuously brought together in a suitable manner with application of turbulence, and subsequently an emulsion is produced in the aqueous phase and the interfacial reaction is carried out.

Thus an object of the invention is a continuous process for the production of microcapsules by interfacial polyaddition of polyisocyanates and H-active compounds which is characterised in that, in a first stage, a mixture is continuously produced under strong turbulence from an inert organic liquid and a polyisocyanate insoluble in the inert liquid, and that in a second stage, the thus obtained inhomogeneous mixture is dispersed in an aqueous, continuous phase and a polyamine is simultaneously or subsequently added and polyadded with the polyisocyanate to the interface.

A further object of the invention is the production of dye-precursor-containing microcapsules and the use thereof for the production of carbon-free copying paper.

The following can be used for carrying out the process according to the invention: As polyisocyanate compounds: aliphatic, cycloaliphatic, araliphatic, aromatic and heterocyclic polyisocyanates, as described, for example, by W. Siefken in Justus Liebigs Annalen der Chemie, 562, pages 75 to 136, for example ethylene diisocyanate, 1,4-tetramethylenediisocyanate, 1,6-hexamethylene-diisocyanate, 1,12-dodecane-diisocyanate, cyclobutane-1,3-diisocyanate, cyclohexane-1,3-and-1,4-diisocyanate as well as desired mixtures of these isomers, 1-isocyanato-3,3,5-trimethyl-5-isocyanatomethyl-cyclohexane (DAS No. 1 202 785, U.S. Pat. No. 3,401,190), 2,4- and 2,6-hexa-hydro-toluylene-diisocyanate, as well as desired mixtures of these isomers, hexahydro-1,3,- and/or -1,4-phenylene-diisocyanate, perhydro-2,4'- and/or -4,4'-diphenylmethane-diisocyanate, 1,3- and 1,4-phenylene-diisocyanate, 2,4- and 2,6-toluylenediisocyanate, as well as desired mixtures of these isomers, diphenylmethane-2,4'- and/or -4,4'-diisocyanate, naphthylene-1,5-diisocyanate, triphenylmethane-4,4',4"-triisocyanate, polyphenyl-polymethylene-polyisocyanates, as obtained by aniline-formaldehyde-condensation and subsequent phosgenation and described, for example, in British Pat. Nos. 874 430 and No. 848 671, m- and p-isocyanatophenyl-sulphonyl-isocyanates according to U.S. Pat. No. 3,454,606, perchlorinated aryl polyisocyanates, as described, for example, in German Auslegeschrift No. 1 157 601 (U.S. Pat. No. 3,277,138), carbodiimide group-containing polyisocyanates, as described in German Pat. No. 1 092 007 (U.S. Pat. No. 3,152,162), diisocyanates, as described in U.S. Pat. No. 3,492,330, allophanate group-containing polyisocyanates, as described, for example, in British Pat. No. 761 626 and the published Dutch Patent application No. 7 102 524. Isocyanurate group-containing polyisocyanates as described, for example, in U.S. Pat. No. 3,001,973, in German Pat. Nos. 1 022 789, 1 222 067 and 1 027 394, as well as in German Offenlegungsschriften Nos. 1 929 034 and 2 004 048, urethane group-containing polyisocyanates as described, for example, in Belgian Pat. No. 752 261 or in U.S. Pat. No. 3,394,164, acylated urea group-containing polyisocyanates according to German Pat. No. 1 230 778, biuret group-containing polyisocyanates as described, for example, in German Pat. No. 1 101 394 (U.S. Pat. Nos. 3,124,605 and 3,201,372) as well as in British Pat. No. 889 050, polyisocyanates produced by telomerisation reactions, as described, for example, in U.S. Pat. No. 3,654,106, ester group-containing polyisocyanates, as mentioned, for example, in British Pat. No. 965 474 and No. 1 072 956, in U.S. Pat. No. 3,567,763 and in German Pat. No. 1 231 688, reaction products of the aforementioned isocyanates with acetylene according to German Pat. No. 1 072 385, polymeric fatty acid radical-containing polyisocyanates according to U.S. Pat. 3,455,883.

It is also possible, to use isocyanate groupcontaining distillation residues accumulated during industrial isocyanate production, optionally dissolved in one or several of the aforementioned polyisocyanates. It is moreover, possible to use desired mixtures of the aforementioned polyisocyanates.

Suitable modified aliphatic isocyanates are those based on hexamethylene-1,6-diisocyanate, m-xylylenediisocyanate, 4,4'-diisocyanate-dicyclohexylmethane or isophorone-diisocyanate, which have at least two functional isocyanate groups per molecule.

Polyisocyanates based on derivatives of hexamethylene-1,6-diisocyanate with a biuret-structure according to DE-AS Nos. 11 01 394, DE-AS 15 43 178, DE-OS 15 68 017, DE-OS 19 31 055 are, moreover, suitable.

Polyisocyanato-polyuretonimines can, moreover, be used, as they arise by carbodiimidisation of biuret group-containing hexamethylene-1,6-diisocyanate with phospho-organic catalysts, by further reaction of primary formed carbodiimide groups with isocyanate groups to produce uretonimine groups.

Isocyanurate-modified polyisocyanates with more than two terminal isocyanate groups can also be used. The production of isocyanurate-modified polyisocyanates based on hexamethylene-diisocyanate is particularly described in DE-OS No. 2 839 133. The rest can be obtained in an analogous manner.

Moreover, diisocyanates according to formula (I) are suitable

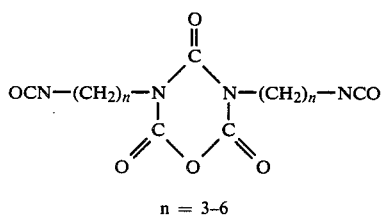

n = 3–6

Also mixtures from the mentioned modified aliphatic and the mentioned aromatic isocyanates, particularly diphenylmethane-diisocyanates, which can be optionally modified, can be used.

Suitable "cross-linking agents" for interfacial reaction with the isocyanates are aliphatic, primary or secondary di- and polyamines, for example: ethylene-(1,2)-diamine, bis(3-aminopropyl)-amine, hydrazine, hydrazine-(2)-ethanol, bis-(2-methylaminoethyl)methylamine, 1,4-diaminocyclohexane, 3-amino-1-methylaminopropane, N-hydroxy-ethyl-ethylene-diamine, N-methyl-bis-(3-aminopropyl)-amine, 1,4-diamino-n-butane, 1,6-diamino-n-hexane, ethylene-(1,2)-diamine-N-ethylsulphonic acid (as an alkali salt), 1-aminoethylene-(1,2)-diamine, (bis-N,N'-aminoethyl)ethylene-(1,2)-diamine. Hydrazine and the salts thereof are also described as diamine in the present context.

Examples of dye-precursors are triphenylmethane compounds, diphenylmethane compounds, xanthene compounds, thiazine compounds, spiropyran compounds.

Particularly suitable are: triphenylmethane compounds: 3,3-bis-(p-dimethylaminophenyl)-6-dimethylaminophthalide ("Crystal Violet Lactone", hereafter referred to as "C.V.L") and 3,3-bis-(p-dimethylaminophenyl)-phthalide ("malachite green lactone"), diphenylmethane compounds: 4,4'-bis-dimethylamino-benzhydrylbenzyl ether, N-halogenphenyl-leucauramine, N-β-naphthyl-leucauramine, N-2,4,5-trichloro-phenyl-leucauramine, N-2,4-dichlorphenyl-leucauramine; xanthene compounds: rhodamine-β-anilinolactam, rhodamine-β-(p-nitroaniline)-lactam, rhodamine-β-(p-chloroaniline)-lactam, 7-dimethyl-amine-2-methoxy-fluorane, 7-diethylamine-3-methoxyfluorane, 7-diethylamine-3methylfluorane 7-diethylamine-3-chlorofluorane, 7-diethylamine-3-chloro-2-methylfluorane, 7-dimethylamine-2,4-dimethylfluorane, 7-diethyl-amine-2,3-dimethylfluorane, 7-diethylamine-(3-acetylmethyl-amine)-fluorane, 7-diethyl-amine-3-methylfluorane, 3,7-diethylaminefluorane, 7-diethylamino-3-(dibenzylamine)-fluorane, 7-diethylamine-3-(methylbenzylamine)-fluorane, 7-diethylamine-3-(chloroethylmethylamino)-fluorane, 7-diethylamine-3-(dichloroethylamine)-fluorane, 7-diethylamine-3-(diethylamine)-fluorane; thiazine compounds: N-benzoyl-leuco-methylene blue, o-chlorobenzoylleucomethylene blue, p-nitro-benzoyl-leucomethylene blue; spiro compounds: 3-methyl-2,2'-spiro-bis-(benzo(f)chromes).

Solvents, which dissolve these dye-precursors, are, for example, chlorinated diphenyl, chlorinated paraffin, cotton seed oil, peanut oil, silicone oil, tricresyl phosphate, monochlorobenzene, moreover partially hydrogenated terphenyls, alkylated diphenyls, alkylated napthalines, arylethers, arylalkylethers, relatively highly-alkylated benzene and others.

Diluents are often added to the solvents, for example kerosene, n-paraffins, isoparaffins.

The water used for emulsifying the colorformer solution, contains emulsifying and/or dispersing agents. As dispersing agents partially hydrolysed polyvinylacetate can be used.

A device suitable for carrying out the process according to the invention is schematically shown in the FIGURE.

The polyisocyanate to be used in the process . according to the invention is in the container (1) and the inert organic phase to be used is in the container (2). Both are continuously metered in the desired ratio into the mixing zone (6) via the metering pump (5a) or (5b).

Commercial pumps can be used as metering pumps (5a) and (5b), which allow an exact metering of liquid, for example gear pumps, membrane pumps, hose pumps and others.

Static mixers which produce high turbulence can be used, for example, as mixers (6).

The aqueous phase is continuously metered via the metering pump (5c) in the desired ratio from the container (3) to the inhomogeneous mixture of polyisocyanate and inert organic phase and supplied to the emulsifying device (7). A double emulsion is thereby formed.

All devices which produce a high shear rate are suitable as emulsifying devices (7), for example mechanical rotor-stator systems, supersonic devices etc.

Immediately after leaving the emulsifying device (7) the formed emulsion reaches the reaction zone (8), where it is mixed in the desired ratio with the polyamines from container (4) via the metering pump (5d).

The formed microcapsule dispersions are then transferred to the container (9),where the dispersion can optionally be given subsequent treatment.

The microcapsules produced according to the process of the invention have a narrow capsule size distribution and a high diffusion impermeability for the core material.

The solutions of dye-precursors containing microcapsules produced according to the process of the invention, are used for the production of carbonless copying paper. The production of reaction copying paper from microcapsules has long been known to form part of the state of the art.

Further details can be drawn from the following examples:

EXAMPLE 1

A solution of 2.7% by weight of crystal violet lactone and 0.9% by weight of N-benzoylleucomethylene blue are prepared in a mixture of 80 parts by weight of diisopropyldiphenyl and 20 parts by weight of isohexadecane.

234.5 parts of this solution are continuously metered into a static mixer with 39.5 parts of biuretized hexamethylene-diisocyanate via the metering pumps (5a) and (5b) and there mixed with each other. The mixture thus formed is a turbid and unclear solution.

The flow of the organic phase is continuously fed into a emulsifying device with a high shear rate together with 320 parts of 0.5 percent partially-hydrolized polyvinylacetate solution (88% degree of hydrolysation).

76 parts by weight of 7.2%, aqueous hydrazine-hydrate solution are added to the formed emulsion under stirring.

The formed microcapsule dispersions are then heated to 60° C. as subsequent treatment and left for 2 hours at this temperature.

COMPARATIVE EXAMPLE

The starting materials and quantities for use are the same as in example 1, however the dye-solution and the isocyanate are firstly mixed discontinuously with each other in a container, under stirring.

The aqueous phase is then added to the same container, also under stirring, and the mixture is emulsified with an emulsifying device at a high shear rate. Then the mixing with the aqueous hydrazine solution and subsequent treatment is carried out according to example 1.

The following characteristics were determined for comparing the capsule dispersions produced in Example 1 and in the Comparative Example:
1. Capsule size distribution
2. Density or impermability of the capsule wall in relation to the core material.

The measurement of the capsule size distribution takes place with a commercial device by Coulter Electronics (Coulter Counter type TA 11). A wide capsule size distribution results in large volume sum proportions in the range of the quadruple average diameter.

In order to measure the density, 5.0 parts of the formed capsule dispersion are diluted with 10 parts of water and then mixed with 10 parts of silicasol (Silicasol F 300 produced by Bayer AG). The mixture is applied to a crude paper in a quantity of about 5 g/m², dried and subsequently annealed for 2 h at 70° C. and 75% rel. humidity. Possible leakages are shown by the paper being strongly dyed blue, since non-encapsulated. dye-solution reacts with silica to produce the dye.

The intensity of the colouring can be determined, for example, as a reflectance value with "Elrephomat" by Zeiss. The reflectance values are calculated according to the following formula:

$$\frac{I_0 - I}{I_o} \times 100 = \text{reflectance value in \%,}$$

wherein,
$I_o$ = reflectance value of the uncoated paper
$I$ = measured value of the sample.

In the case of the Comparative Example and Example 1, the following values for grain size distribution and density measurement are obtained:

| Example 1 | | Comparative Example |
|---|---|---|
| average capsule size | 7.2 μm | 5.8 μm |
| capsule size proportion above 24 μm | 0% | 5.2% |
| density (% reflectance) | 5.6 | 21.4 |

In spite of relatively small average capsule size, the volume proportion of capsule sizes above 24 μm is greater in the Comparative Example than in Example 1. Moreover, the capsule of the Comparative Example is substantially more leaking, as can be seen from the high reflectance values.

EXAMPLE 2

5 parts by weight of a dye of the aminofluorane type are dissolved in a mixture of 50 parts by weight of dodecylbenzene and 50 parts by weight of diisopropyldiphenyl. 223 parts of this solution are, as described in example 1, continuously mixed with 39.5 parts of Oxadiazintrion by Desmodur H (NCO-content 20.5%). Subsequently continuous mixing with 320 parts by weight of a 0.5% polyvinyl alcohol solution and emulsifying takes place at shear rate. The crosslinking takes place with 76 parts by weight of a 9.0% diethylene-triamine solution. Subsequent treatment takes place according to example 1.

A 40% capsule-containing dispersion with a capsule size of 7.3 μm is obtained. The proportion of capsules above 24 μm is 0.4%

EXAMPLE 3

2 parts by weight of a dye of the fluorane type (Pergascript Rot 16B) are dissolved in 90 parts by weight of dodecylbenzene and 10 parts by weight of diisopropyldiphenyl.

223 parts by weight of this solution are continuously metered with 39.5 parts by weight of a mixture of 90% of biuretized hexamethylene-diisocyanate and 10% of carbodiimide-modified polymethylenepolyphenyl-diisocyanate (28% NCO, Desmodur CD by Bayer AG) in the static mixer (6), the formed organic phase is turbid.

This phase is continuously mixed with 367 parts of an aqueous phase containing 0.5% part-saponified polyvinylacetate (degree of saponification 88%) and fed into the emulsifying device (7). 120 ml of a 5.6% aqueous diethylene-triamine solution are added to the formed emulsion. A 35% capsule-containing dispersion is obtained. The average capsule diameter is 7.5 μm.

EXAMPL 4

The procedure is as described in example 4, however a mixture of 85% of isocyanurate-modified Desmodur H (isocyanate content 20.5%) and 15% of polymethylenepolyphenyl-diisocyanate is used as the polyisocyanate. A 35% capsule-containing dispersion is obtained. The average capsule diameter is 7.0 μm.

We claim:

1. A two-step process for the production of microcapsules by interfacial polyaddition of polyisocyanates and H-active compounds wherein (i) in a first stage an inert organic phase and a polyisocyanate insoluble therein are continuously metered into a mixing zone under strong turbulence to obtain an inhomogenous mixture, and (ii) in a second stage this inhomogeneous mixture is continuously emulsified in an aqueous phase with a di- or polyamine added to the resulting emulsion and polyadded to the interface with the polyisocyanate.

2. A process according to claim 1, wherein the organic phase contains dissolved dye-precursors.

3. Dye-precursor-containing microcapsules made by a process according to claim 2, for use in the production of carbon-free copying paper.

* * * * *